Figure 1:
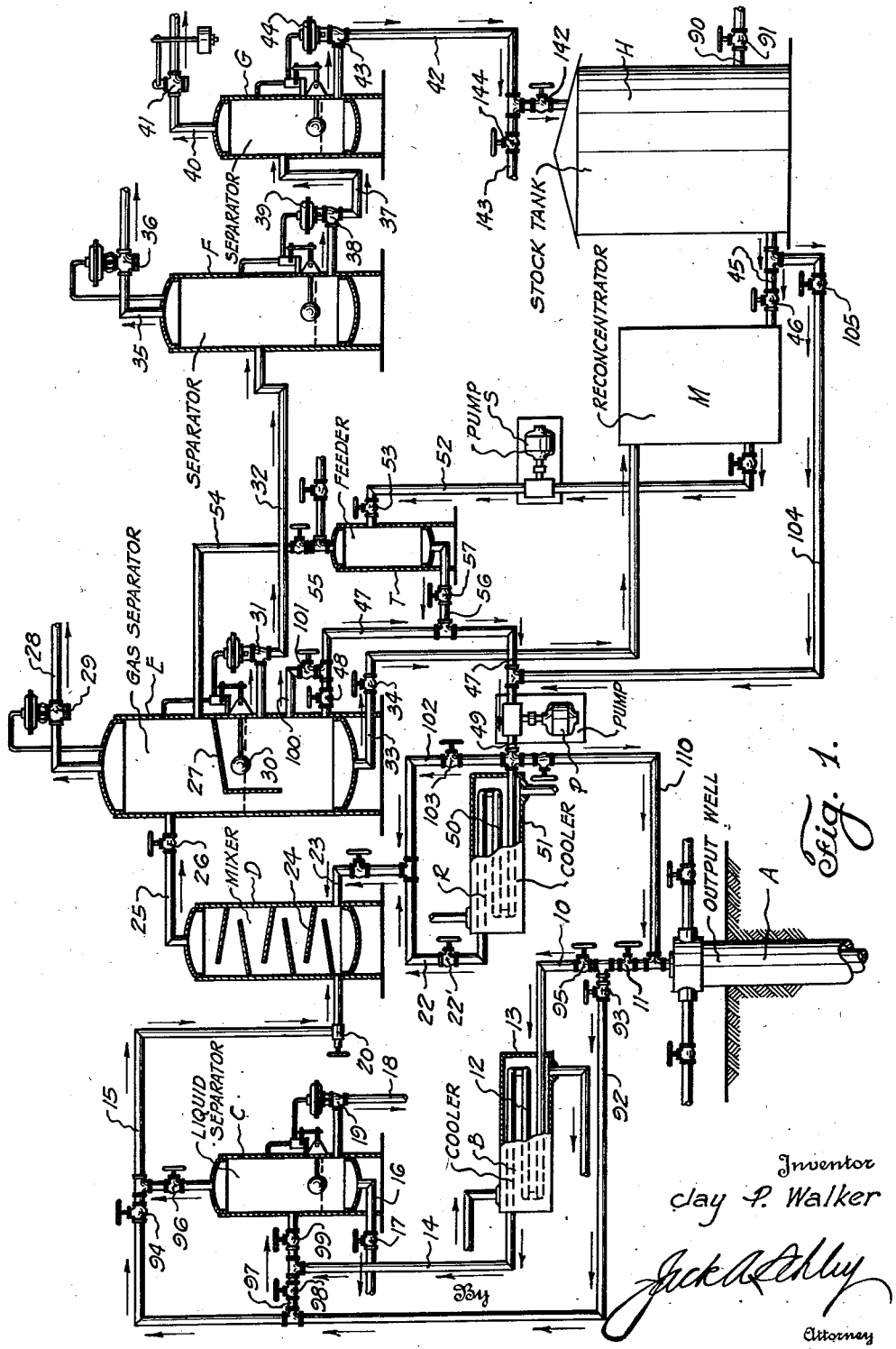

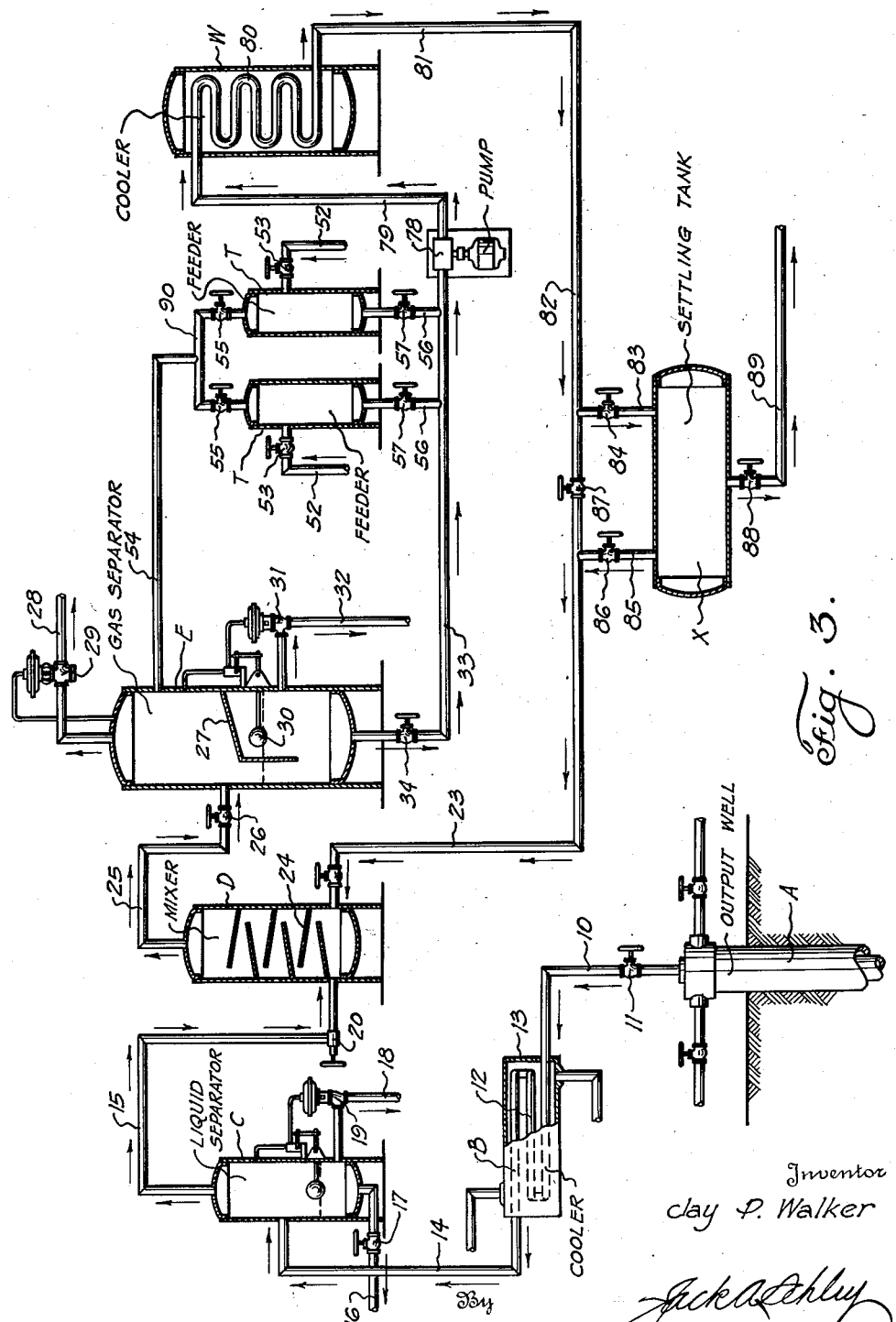

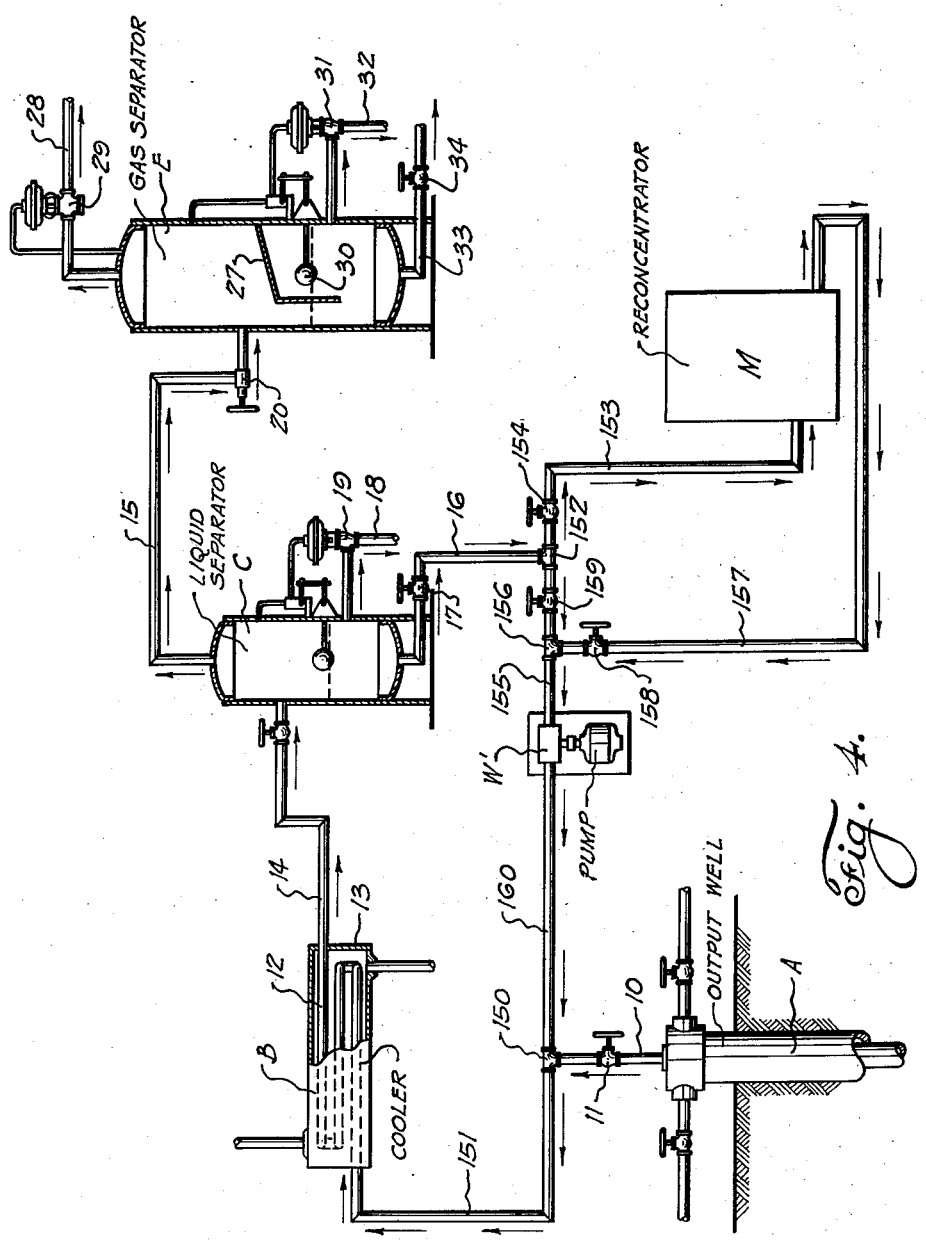

Patented Apr. 7, 1942

2,278,750

UNITED STATES PATENT OFFICE 2,278,750

METHOD OF RECOVERING LIQUEFIABLE HYDROCARBONS FROM GASES OR GASEOUS FLUIDS

Jay P. Walker, Tulsa, Okla., assignor to Eureka Process Corporation, Tulsa, Okla., a corporation of Delaware Application May 3, 1939, Serial No. 271,463

5 Claims. (Cl. 62—175.5)

This invention relates to new and useful improvements in methods of recovering liquefiable hydrocarbons from gases or gaseous fluids.

The invention has to do with the processing of high pressure gases or gaseous fluids which are natural in the subsurface reservoir, and which contain liquefiable hydrocarbon constituents in solution with such gases or fluids, as well as water vapors. These gases or gaseous fluids when in the reservoir have high temperatures, usually above 100 degrees F., and are under pressures usually greatly in excess of 1,000 pounds, but may be found at pressures as low as approximately 700 pounds. The wells from which these high pressure gases or gaseous fluids flow are variously known as "distillate," "condensate" or "combination" wells.

The presence of these liquefiable constituents in a vaporous or uncondensed form is said to be due to retrograde vaporization. It has been found that when the pressure is reduced within said range, even though the temperature is not otherwise reduced, retrograde condensation occurs. Under retrograde vaporization hydrocarbon liquids go into the gas phase, or into solution with the gas, in some function of the ascending order of their boiling or end points, as the pressure increases at constant temperatures; while by retrograde condensation the vaporized hydrocarbons are condensed in some function of the descending order of their boiling or end points, at constant temperatures as the pressure decreases.

It has been definitely demonstrated that cooling of these gases, whether by pressure reduction alone, within the retrograde condensation range, or by auxiliary cooling, or by both, will condense and precipitate these hydrocarbon constituents; whereby they may be recovered and the gas separated at high pressures within said range. It also has been established in performing the method covered by Patent No. 2,080,351, that liquefiable hydrocarbon components may be recovered by absorption, and unless the reflux is cooled to a sufficient extent, there may be no condensation or condensing action. From this, it follows that a reflux composed of hydrocarbon liquids and a reagent may be circulated and admixed with the flowing stream without reducing the temperature of said stream, and in fact the temperature of the stream may even be increased. However, when the reflux is properly cooled and admixed with the flowing stream, there will be, in addition to the recovery resulting from absorption or agglomeration, condensation and precipitation of hydrocarbon components.

It is highly desirable to recover a maximum of hydrocarbon liquids and to separate the gas, at the highest possible pressure, for the reason that in most fields, where these wells are drilled, the law requires that the gas be returned to the reservoir from whence it originated. Compression costs are controlling economic factors, therefore, the higher the pressure at which the residual gas is separated, the less the cost of raising its pressure to the degree necessary to return it to the reservoir.

In some of these reservoirs free liquids may underlie the gas and may flow with the gas up the well bore or pipe. Due to pressure drop, as well as natural heat exchange, during the upstream flow, from the bottom of the well to the surface, certain of the vaporous components will condense, thus increasing the liquid content of the well stream. Free water and water vapors are found in most of these gases in addition to liquid hydrocarbons. Thus, both free water and hydrocarbon liquids may flow from the reservoir with the gas and, by condensation as above pointed out, both the water and hydrocarbon liquid content of the stream may be increased while the stream is flowing up the well from the reservoir to the well head.

The presence of water and water vapors is a serious menace to profitable recovery of liquefiable hydrocarbons, because in order to obtain maximum hydrocarbon recoveries, it may be necessary to cool the gas below the critical temperatures at which gas hydrates form. The formation of gas hydrates seems to be generally accelerated at high pressures, therefore, apparently the higher the pressure at which the gas is processed, or at which the cold liquid hydrocarbons are circulated, the greater the hydrate or freezing trouble. Of course, when the plant clogs or freezes up, it ceases to operate, unless alternate apparatus is provided, and such an apparatus may be more expensive and does not always solve the problem.

The free water which flows from the well head may be, under proper conditions, readily extracted from the well stream, by settling such water in a suitable separating tank or water knockout, at which time the free hydrocarbon liquids may also be separated from the gas stream, or allowed to flow on therewith. Certain of the water vapors and heavier hydrocarbon vapors may be condensed by cooling the well stream prior to discharging it into the separating tank or water knockout, but the temperature should not be reduced below the critical degree at which gas hydrates form, or freezing occurs, with respect to the particular hydrocarbon components making up the gas or flowing stream, unless prior to such temperature reduction, the well stream has been made impotent to the formation of gas hydrates or freezing. It is, of course, usually desirable to get rid of as much water or water vapor as is possible, especially if the temperature is to be reduced below the point of hydrate formation; also it is economical and desirable from an operating standpoint to extract the free hydrocarbon liquids, but the method is not to be limited to this latter extraction at this point in the performance of the same.

While free water may be substantially eliminated, varying amounts of water vapors remain in the gas stream, and unless these vapors are absorbed or controlled, they will, in co-action with the gas, cause the formation of gas hydrates when the temperature of the gas stream is reduced below the critical degree F. It has been found that by admixing with the stream being processed any of a number of reagents, which act as an inhibitor or medium to prevent or restrain, the formation of gas hydrates or ice, at prevailing temperatures, the plant may be continuously operated and either frequent or periodic interruptions thereby eliminated. The reagent may be one which has a marked affinity for water and when admixed with the gas may have the function of absorbing water vapors or drying the gas; and when mixed with water or a hydrocarbon liquid will inhibit the formation of hydrates or prevent freezing, at the prevailing temperatures, or if contacted with a frozen particle or mass, will thaw the same.

While it is preferable that such reagent or medium be miscible with the water, it would, of course, be possible to employ one which would produce the desired reaction but which would readily segregate or separate from water in a settling tank or separator. It is very important and desirable that the reagent employed must not be miscible with the hydrocarbon liquids, and will readily separate therefrom, so as not to require undesirable processing of the recovered hydrocarbon liquids to separate the said reagent and its water therefrom. It is, of course, preferable to use a reagent which is substantially noncorrosive and which will not injure the mechanical apparatus or cause impedance in the operation of the plant; however, the invention is not to be limited in this respect, beyond the scope of the claims appended hereto.

It is, therefore, one of the objects of this invention to provide an improved method wherein the formation of gas hydrates or freezing may be controlled or avoided by admixing with the flowing stream a suitable reagent, or so-called antifreeze medium, so that when the temperature of the stream being processed, is reduced to or below the lowest working temperature employed in the method, the formation of gas hydrates or freezing or clogging of the plant will be prevented.

A particular object of the invention is to provide an improved method wherein the formation of gas hydrates or freezing, may be avoided or restrained by admixing with the flowing stream a suitable reagent, which while preferably non-corrosive and which should not attack the metal or other elements of the apparatus and injure them in the ordinary operation of a plant, will under all circumstances inhibit the formation of gas hydrates or freezing of the liquids being processed.

A further object of the invention is to provide a method of the character described, wherein a suitable reagent, preferably in a liquid form, is admixed either with the flowing stream, or with a refluxed hydrocarbon liquid introduced into the flowing stream, and when so admixed or introduced is flowed concurrently with the stream, prior to the separation of the residual gas therefrom; it being especially desirable to make such an admixture after free liquids, particularly water, have been extracted from the flowing stream.

An important object of the invention is to provide an improved method of the character described wherein the reagent employed is miscible with water so that the admixture of such reagent and free water may be drawn off and reconcentrated by removing part or all of the water content, thus enabling the reagent to be re-used effectively.

A further object of the invention is to provide an improved method wherein a reagent may be recirculated or refluxed with the flowing well stream to inhibit the formation of gas hydrates or freezing, or to thaw out either crystalline or ice formations, but which, if properly cooled, also acts as a cooling medium when admixed with the flowing well stream to condense liquefiable hydrocarbon constituents and thereby aid in the recovery of such liquefiable components.

Still another object of the invention is to provide an improved method wherein a portion of the recovered hydrocarbon liquids may be circulated or refluxed in conjunction with the reagent, whereby in addition to the inhibition function of the reagent, the recycled or refluxed hydrocarbon liquids will act as an agglomeration medium; and if such refluxed liquids are cooled, in some suitable manner to the proper extent, the flowing stream will be cooled and additional recovery of hydrocarbon components by condensation and precipitation will be effected.

A further object of the invention is to provide an improved method wherein the stream flowing from the well is first cooled, in any suitable manner, to a point slightly above or in the vicinity of the critical degree at which hydrates will form or ice will accumulate at prevailing pressures, for the purpose of condensing water, as well as hydrocarbon components. The water alone may be extracted or the liquefied hydrocarbons may also be extracted. The cooling and extracting steps are followed by reducing the pressure only within the retrograde range of condensation, but to the ultimate pressure at which the gas is separated, and then admixing the reagent, whereby the hydrocarbon components which have been condensed and precipitated may be recovered economically and efficiently, making it possible to employ comparatively inexpensive apparatus.

A particular object of the invention is to provide an improved method wherein a reagent is employed to inhibit the formation of gas hydrates or freezing and the recovery of liquefiable hydrocarbons from a gaseous well stream together with the separation of the residual gas at pressures within the range of retrograde condensation; and which method is of such a flexible nature as to permit pressure reductions, cooling and their various ramifications at one or more places in the method or at such selected points as may best suit the particular mode being employed or which may omit either cooling or pressure reduction at any particular point in the method.

An important object of the invention is to provide an improved method wherein an inhibiting reagent is first admixed with the well stream and said stream then cooled, in any suitable manner, sufficiently to condense all of the water vapors, which is followed by the step of extracting the water, whereby the stream is rendered impotent to freezing or the formation of gas hydrates and may be processed in any suitable way to recover liquefiable hydrocarbon constituents.

Another object of the invention is to provide a method of the character described wherein the reagent liquid is introduced and the temperature of the flow stream is reduced by the same step, and also wherein the pressure may be reduced within the retrograde range at the same time.

A further object of the invention is to provide a method of the character described wherein the pressure of the flowing well stream may be controlled and reduced at any desired point, also wherein the stream may be cooled in any suitable way at whatever point is found desirable, but preferably prior to extracting free liquids so as to increase the amount of liquid which may be extracted, together with the step of admixing and flowing with the stream, a reagent liquid for controlling or defeating the formation of gas hydrates, or freezing or for thawing such formations, which may also be used to reduce the temperature of the stream.

A construction designed to carry out the invention will be hereinafter described, together with other features of the invention.

Figure 2:
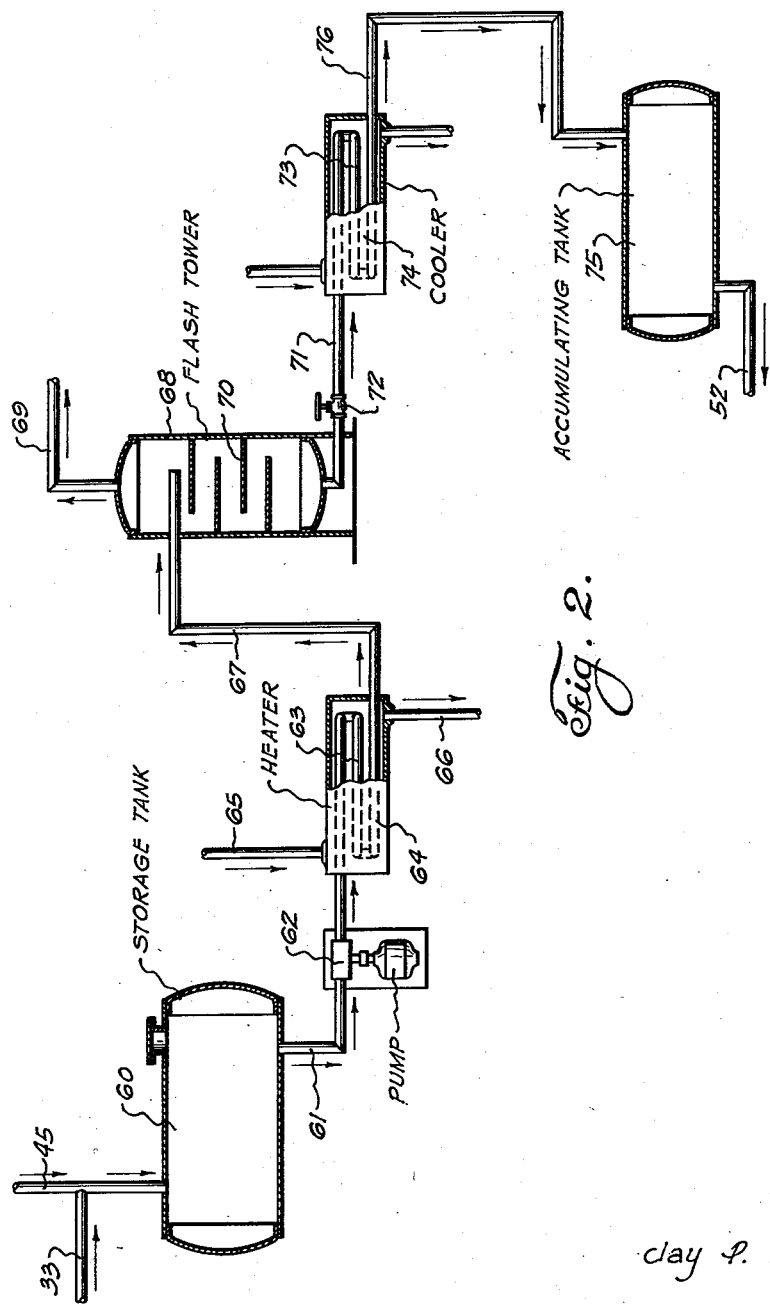

The invention will be more readily understood from a reading of the following specification and by reference to the accompanying drawings, in which an example of the invention is shown, and wherein:

Figure 1 is a diagrammatical view of an apparatus for carrying out the method and various ramifications of the same, Figure 2 is a diagrammatical view of a reconcentrating unit for dehydrating the water and reagent mixture, Figure 3 is a diagrammatical view of an apparatus for carrying out another form of the method, and Figure 4 is a diagrammatical view of another form of apparatus for rendering the flowing stream impotent to the formation of gas hydrates or freezing, whereby water vapors are removed, thus permitting the recovery of liquefiable hydrocarbon constituents by any suitable subsequent steps.

In the drawings, the letter A designates a distillate, condensate or combination well, from the head of which a flow pipe 10 extends. This pipe may include a valve 11 of any suitable construction for use in this method and it may be either a cut-off valve, a regulating or control valve, or a choke valve, and it may be omitted entirely, if desired. Under some conditions at different wells, it may be desirable to regulate, control or choke the flow of the well stream, at this point, for the purpose of reducing the pressure or for any other useful purpose.

The pipe 10 conducts the well stream from the well at well-head flowing pressure, if the valve 11 is not used or is left wide open. For the purpose of illustration and explanation, certain figures relating to pressures and temperatures will be used in this description, but it is to be clearly understood that they are in no sense limitations or essentials of the invention, but are merely recited as an aid of those skilled in the art in carrying out the invention.

The pipe 10 is connected with the coil 12 which extends through the jacket 13 of a cooler B in which jacket any cooling medium may be used, water being preferred because it is less expensive. Where the well-head pressure is 3,000 pounds and the temperature of the well stream flowing through the pipe 10 is substantially 140 degrees F., such pressure may be maintained during the flow through the cooler B, but the temperature of the well stream may be reduced to 82 degrees F., as an illustration. The coil 12 is connected with a pipe 14 which extends to an upright separating tank or water knockout C, preferably at the midsection thereof.

The well stream discharging into the pipe 10 will contain free water and some liquid hydrocarbons which latter will usually be of the high end point or heavier type. Some of these liquids may have come from the reservoir with the gas and others may have condensed and precipitated during flow from the reservoir. These liquids will flow with the gas through the coil 12 and the temperature drop of nearly 60 degrees in the cooler B will cause further condensation and precipitation of water vapors and hydrocarbon vapors of the heavier order. Thus, when the stream discharges into the tank C, it will include varying amounts of liquids which will gravitate and readily settle to the bottom of the tank. Ordinarily, the percentage of hydrocarbon liquids will be higher than the water but this is subject to variation. A water drain pipe 16 including a cut-off valve 17 extends from the bottom of the tank. A liquid hydrocarbon discharge pipe 18 extends from the side of the tank above the water level for carrying off the accumulated hydrocarbon liquids. This pipe includes a float-operated diaphragm valve 19, whereby the accumulated hydrocarbon liquids will be periodically discharged; however, any valve suitable for the purpose may be used.

The gaseous fluids which are separated from the liquids in the tank C, and which flow as a stream therefrom, will have in solution with the gas, or entrained therewith, certain liquefiable hydrocarbon constituents and more or less water vapors. This gaseous or well stream flowing from the tank C will include those liquefiable hydrocarbon components and water vapors which were not condensed or extracted in said tank, and such hydrocarbon components will be predominately of the lower boiling or end point order, and more especially those which will condense when the pressure is reduced within the intermediate or lower realms of the retrograde condensation range; however, such high boiling point hydrocarbons as were not condensed will be carried out with the gas. So long as the temperature is held above the critical degrees at which gas hydrates form, freezing or clogging of the flow lines will be avoided.

The stream flows from the tank C under approximately 3,000 pounds pressure unless such pressure is reduced at the valve 11, and at a temperature of about 82 degrees F., and enters a pipe 15. The pipe 15 enters the side of a mixing tank or vessel D, near the bottom thereof and has connected therein a choke or regulating valve 20. While the choke may be adjusted to give any desired pressure reduction, it is set for the purpose of the present illustration, to reduce the flowing pressure from approximately 3,000 pounds to 1,600 pounds, a drop of some 1,400 pounds. According to gas laws, it has been observed with some gases that such a drop gives a temperature reduction of approximately 42 degrees F., thereby bringing the stream temperature down to substantially 40 degrees F., which is below the critical degrees at which gas hydrates will form.

The invention, as illustrated, contemplates at this point, or some other point, the introduction of a reagent, which in the preferred form being described, is a liquid. Any reagent suitable for inhibiting the formation of gas hydrates or freezing, or for dissolving or thawing out hydrate or ice formations, may be used. Several liquids are available. While alcohol alone or admixed with glycerine can be used, it is highly desirable to employ a non-corrosive fluid, or one that will not injure the metal fittings of the plant, nor have a tendency to corrode the pipe lines and fittings or possibly be injurious to the input well. Glycerols or glycols, including ethylene glycol or diethylene glycol, or any other reagent suitable for the purpose, may be used. While it is desirable to use a reagent which is non-corrosive, the invention is not to be limited to the same and it may include as a reagent any salt and particularly calcium chloride. One composition of this class, may be purchased in the open market under the name of "Prestone." While it is preferable to use a liquid which is miscible with water, and not miscible with distillate, and which will readily settle out of hydrocarbon liquids, it would be within the scope of the invention to employ a liquid heavier than water and which would settle out of both water and hydrocarbon liquids.

A pipe 23 for supplying a suitable reagent liquid is connected to the tank D at its lower portion. The stream flowing from the choke 20 through the pipe 15, at its reduced pressure, immediately begins to mix with the reagent liquid, as it flows into the mixing tank D. This concurrent flow is continued up through the said tank and in order to promote a thorough admixture, baffles 24 may be provided in the tank. The effect of this admixture is to lower the critical degree at which gas hydrates would form for the particular gaseous composition of the flowing stream being processed. Thus, when water vapors flowing in the gas stream condense, on account of the pressure and temperature reduction, the water condensates will admix with the reagent liquid, and thereby be prevented from forming gas hydrates. It is within the scope of this invention to employ the reagent as a thawing means after the formation of gas hydrates or freezing.

The pressure and temperature reduction will cause condensation and precipitation of liquefiable hydrocarbon constituents and these condensates or liquids will be carried from the mixing tank D, with the other liquids and gas, by way of a pipe 25, which may include a valve 26, of any suitable type for use in this method; and by means of which valve another pressure drop and incident cooling may be made, if desired. The admixed stream, however, in the illustration under discussion, is still under the reduced pressure of 1,600 pounds, and except for the drop, due to flowing, will enter a high pressure separator E, at such pressure by way of the pipe 25. This separator may be of any suitable type, but preferably has a deflector 27 below the inlet, so that the influent liquids will not agitate the settled liquids which have stratified in the lower portion of said separator. After the primary pressure reduction through the choke 20, no further pressure reduction is necessary to successfully recover liquefiable hydrocarbon components.

A gas escape pipe 28 leads from the top of the separator and includes a suitable pressure regulating valve 29, whereby a pressure of approximately 1,600 pounds may be maintained in the separator. It is most desirable to separate the gas at as high a pressure as is possible, because in most instances it will be compulsory or desirable to return the gas to the formation from which it was produced. In such event, the higher the pressure of the uncondensed or residual gas, the less will be the cost of compression. Where pressure reduction and attendant cooling is dependent upon to recover the liquefiable hydrocarbons, it will, with most gases, be necessary to go to the intermediate or lower brackets of the retrograde range for the particular composition being processed, if high recoveries are to be made. But where compression costs must be watched and controlled, the gas should be separated at a maximum pressure, commensurate with the recovery; but almost invariably such economic recovery will require that the temperature used for such recovery be well below the temperature at which gas hydrates will form, and consequently the absolute and dire necessity of having present a liquefaction or cooling liquid which is also capable of preventing hydrate formation. Such an end is sought in the illustration given herein, where the recovery is made at substantially 1,600 pounds.

Below the deflector 27 is located the float 30 of a diaphragm-operated outlet valve 31 connected in a pipe 32 leading from the side of the separator E. The float is buoyant in oil or hydrocarbon liquid and maintains a suitable hydrocarbon liquid level. The admixture of water and reagent liquid will gravitate towards the bottom of the separator, and the hydrocarbon liquid which is not miscible therewith, will float therein and may be drawn off therefrom through line 32 and valve 31. A drain pipe 33 leads from the bottom of the separator and includes a cut-off valve 34.

The recovered hydrocarbon liquid or distillate which is discharged into the pipe 32 may be disposed of in any suitable manner, as may also be the gas conducted by the outlet pipe 28. It may be desirable to connect the pipe 32 to a secondary separator F and conduct the hydrocarbon liquid thereto. Considerable gas in solution will usually flow with the liquids, and perhaps small amounts of the reagent admixture will enter the separator F therewith. A gas escape pipe 35 extends from the top of the separator F and includes a pressure regulating valve 36, which may be set to hold a working pressure of 100 pounds or higher in said separator. The pressure reduction in this separator will result in flashing off a large percentage of the more volatile gases. This flashing or weathering operation or its equivalent is necessary to release the volatile gases which are dissolved in the liquids; it makes the liquids which settle in the bottom of the separator F more stable.

A liquid outlet pipe 37 leads from the lower portion of the separator F to a low pressure separator G. A discharge valve 38 having a float-controlled diaphragm operator 39 is connected in said pipe. The hydrocarbon liquid which is discharged into the pipe 37 may carry small quantities of the reagent admixture. The low pressure separator G has a gas escape pipe 40 leading from its top. A pressure regulating valve 41 is connected in the pipe 40 and may be set to hold a working pressure of 5 pounds or higher in the separator. Gas flashed off in the low pressure separator renders the recovered hydrocarbon liquid still more stable.

A liquid discharge pipe 42 including an outlet valve 43, leads from the separator G to a stock tank H. A float-controlled diaphragm operator 44 is connected to said valve and the separator. The hydrocarbon liquid may be discharged into the stock tank at a very low pressure and substantially free from undesirable gases. A valve 142 is connected in the pipe 42 just above the tank H. A pipe 143 including a valve 144 leads from the pipe 42 above the valve 142 and may be connected with a still or a stabilizing column. When the pipe 143 is used, the valve 142 is closed and its valve 144 is opened, otherwise the valve 142 is open and the valve 144 is closed. Whatever reagent admixture flows into the stock tank or other receiver will settle to the bottom thereof and may be drawn off off through a pipe 45 including a cut-off valve 46. It is, of course, possible that no such admixture will flow with the hydrocarbon liquids from the high pressure separator E through the pipe 32. Either or both of the separators F and G may be omitted. A discharge pipe 90 leads from the stock tank H for the purpose of drawing off the recovered hydrocarbon liquids. A cut-off valve 91 is included in this pipe.

While the liquid reagent may be supplied to the pipe 23 in any suitable manner, it is desirable to recycle such admixture, adding whatever fresh liquid may be necessary and extracting water therefrom as may be necessary. A pipe 47 including a valve 48 leads from the side of the separator E, at a point above the bottom and is connected with a high pressure pump P from which a pipe 49 extends to the coil 50 of a cooler R. The coil extends through a jacket 51 and is connected with the inlet pipe 23, by means of a pipe 22 including a valve 22'. The reflux reagent admixture may be cooled to any desirable degree. If introduced into the mixing tank D at a sufficiently lower temperature than the flowing stream, it will provide additional cooling, and in such instance the pressure of the stream need not be lowered to such an extent, as where pressure reduction alone is depended upon.

The pipe 33 which drains the admixture from the bottom of the separator E may be connected with a reconcentrating or dehydrating unit M. Dehydrated or rejuvenated reagent liquid will be pumped from the unit through a pipe 52 including a small pump S. This pipe enters the side of a charging vessel T and includes a valve 53. A pressure equalizing pipe 54, including a valve 55 connects the top of the vessel with the gas zone of the separator E. A feed pipe 56 including a valve 57 leads from the bottom of the vessel to the pipe 47. As required, reagent liquid is fed into the reflux.

While the reconcentrating unit M may assume any suitable form, it is desirable to employ a structure which will provide ample reagent liquid for carrying out the method. In Figure 2, a restoring or reconcentrating unit is shown in diagram form. The pipe 33 which drains the reagent and water mixture from the high pressure separator E leads to the upper side of a horizontal storage tank 60, which has ample capacity for the system. A flow pipe 61 having a pump 62 connected therein leads from the tank to the coil 63 of a steam heater 64. Steam is supplied from a suitable source by a pipe 65 and is carried off by a pipe 66.

The reagent admixture may reach the tank at a temperature of approximately 40 degrees F., but this is subject to a wide variation. Taking such a temperature as an illustration, it will be necessary to heat the admixture to a point considerably above the boiling point of water, at atmospheric temperature, because the admixture will be under some pressure, and high heat will be required to boil off the water; further the particular reagent liquid which is used may not readily segregate from the water at lower temperatures. In the illustration used herein, the admixture passing through the heater is heated to about 240 degrees F. and conducted therefrom by a pipe 67. The pipe 67 enters the upper portion of a flash tower 68. When the heated stream is discharged into the tower the water will have been converted into steam which will be flashed off in said tower. This steam will escape from the top of the tower through a pipe 69.

When the steam is flashed off the remaining liquid will flow down the tower and cascade over staggered baffles 70. Owing to the temperature maintained in the tower, additional water will be boiled off from the cascaded liquid, which will be spread more or less into film-like streams. The dehydrated reagent liquid will collect in the bottom of the tower from which it is conducted by a pipe 71 including a valve 72, to the coil 73 of a cooler 74. The temperature of the reagent liquid is reduced in the cooler, according to the requirements of the plant and the cooling medium used. An accumulating tank 75 is connected with the coil by a pipe 76 and the pipe 52 (Figure 1), which leads to the charging vessel T, is connected with said tank.

Another plant illustration is set forth in Figure 3. This plant is a circulation or reflux system and it is not considered necessary to describe it in detail, particularly where the same elements which have been explained, are used. The pipe 15 from the tank C and the mixing tank D and high pressure separator E are connected, substantially as shown in Figure 1.

The pipe 32 leads to storage for the recovered hydrocarbon liquids or otherwise. The pipe 33 drains the water and reagent mixture from the bottom of the separator E and is connected to a pump 78 which discharges the admixture into a pipe 79, connected with the coil 80 of an ammonia cooler W. A pipe 81 leads from the coil and is connected to a pipe 82, which delivers the cold admixture to the pipe 23. A settling tank X is connected in the pipe 82 by an inlet pipe 83, including a valve 84. A return pipe 85, including a valve 86, leads from the opposite end of said tank. A valve 87 is connected in the pipe 82 between the pipes 83 and 85.

When the entire admixture is being recirculated, the valve 87 is open and the valves 84 and 86 are closed. If it is desired to remove a portion of the reflux for reconcentrating, the valve 87 is closed and the valves 84 and 86 are opened. This causes the reflux to flow through the tank X and by opening the valve 88 in a drain pipe 89, a portion of the reflux may be carried to the dehydrating unit. Two charging vessels T are shown connected by a header 90 to which the pipe 54 is attached. The pipes 56 are connected in the pipe 33.

Where the reagent admixture is re-circulated, particularly at increased speeds more or less distillate or hydrocarbon liquids will be circulated therewith. The admixture, when thus re-circulated, becomes a liquefying medium and the flow stream may be cooled to very low temperatures without the formation of gas hydrates; although it may be necessary, in some instances, to increase the rate of flow of this reflux to defeat the formation of gas hydrates.

It may be desirable to omit the preliminary steps of cooling and extracting liquids and, therefore, a by-pass pipe 92 is connected in the pipe 10 between the valve 11 and the cooling coil 12. The opposite end of this pipe is connected to the pipe 15. A cut-off valve 93 is connected in the pipe 92 adjacent the pipe 10 and a second cut-off valve 94 is connected in the pipe 92 adjacent the pipe 15. When it is desired to by-pass the well fluid, a cut-off valve 95 connected in the pipe 10 between the coil 12 and the pipe 92 is closed and the valves 93 and 94 are opened. The well fluid is then conducted by the pipe 92 around the cooler B and the separator C directly to the pipe 15. To prevent the stream flowing back into the separator C, a valve 96 is connected in the pipe 15 just above said separator. It may also be desired to extract the condensed liquids without cooling and for this purpose a short pipe 97 including a valve 98 connects the pipe 92 with the pipe 14. By closing the valve 94 and opening the valves 98 and 99, the well stream will flow through pipes 92, 97 and 14 into the separator C, whereby liquids may be extracted without cooling the gas. If it was desired to cool the gas and not extract liquids in tank C, the valves 93 and 99 could be closed and the valves 95 and 98 and 94 opened which would cause the well stream to flow through the cooler B and then through the pipe 14 and then by way of pipes 97 and 92 to pipe 15.

It will be noted that a pipe 100 including a valve 101 (Figure 1) extends from a higher elevation in the separator E to the pipe 47 beyond the valve 48. By opening the valve 101 a portion of the recovered hydrocarbon liquid may be re-circulated as a reflux with the reagent liquid as taught by Patent No. 2,080,351. If cooling or additional cooling of the reflux is not required, the valve 22' in the pipe 22 is closed so as to prevent flow through the coil 50, and circulation of the cooling fluid through the cooler R is thus stopped. In such event, the reflux liquid is discharged from the pump P into the pipe 49 and is conducted by a branch pipe 102 to the pipe 23 which discharges it into the mixer D. When the pipe 102 is not in use a valve 103 connected therein is closed and the valve 22' is opened.

When the pressure is successively reduced in the separators F and G, the liquid is cooled due to the expansion of the gas therein and, consequently, when the admixture of the reagent liquid and water accumulates in the bottom of the stock tank H, it will be very cold. Instead of passing this liquid through the reconcentration apparatus M the valve 46 may be closed and the liquid by-passed to the pipe 47 by a pipe 104 including a valve 105. This liquid may be sufficiently cooled that it will not be necessary to use the cooler R, and if this latter method was depended upon entirely, the valve 34, 48, 101 and 22' would be closed and the valve 103 would be opened.

It is practical to introduce the reagent into the flow stream at any desired point. As an illustration, in addition to refluxing the reagent and water mixture as has been described, it would be possible to connect a pipe 110 to the junction of the pipes 49 and 102, and conduct a portion of the reagent mixture to the well stream conducting pipe 10 below the valve 11, thus permitting the stream to be cooled to a low temperature in the cooler B. The condensation and precipitation of liquefiable components would thus be increased and when extraction was made in the separator C, more liquids, particularly water, would be taken out. This would leave less water vapor to be absorbed after reducing the pressure through the choke 20. The reagent mixture and water drained through the pipe 16 could be suitably handled so as to recover the reagent liquid and return it to circulation.

In Figure 4, I have shown an arrangement whereby all of the water and water vapor may be extracted prior to processing for the ultimate recovery of liquefiable hydrocarbon constituents. Parts, which are substantially the same as hereinbefore described, are designated by the same numerals and letters. The flow pipe 10 from the well is connected by a T 150 with a flow pipe 151 which leads to the coil 12 of the cooler B. The pipe 14 leads from the cooling coil to the separator C, so that the cooled well stream is discharged into said separator.

The outlet pipe 16 is connected to a T 152 from which a pipe 153, including a valve 154, extends to the reconcentrating unit M. A pipe 155 extends from the opposite side of the T to a high pressure pump W'. The outlet of the unit M is connected by a pipe 157 with the T 156 and has a valve 158 connected therein. A valve 159 is connected in the pipe 155 between T 152 and T 156. A discharge pipe leads from the pump W' to the T 150.

By this arrangement, the reagent liquid may be drawn off through the pipe 16, while other liquids are discharged through the pipe 18. The settle reagent liquid carried out through the pipe 16 is delivered to the pipe 155, the valve 159 being open and the valves 154 and 158 being closed. The reagent and water mixture is picked up by the pump W', whereby its pressure is raised sufficiently to inject said mixture into the well stream by way of a pipe 160 which extends to the T 150.

The well stream may be cooled to a temperature well below the critical degrees at which gas hydrates form and thereby the water vapors will be condensed. Thus, all of the water content may be extracted from the flow stream in the separator C, together with the free hydrocarbon liquids. This method removes all water moisture from the flow stream and it may be carried through any further steps to recover liquefiable hydrocarbon constituents without danger of hydrates or freezing. While the pipe 15 is shown as connected to the separator E, this phase of the invention is not to be limited to any particular recovery method.

As pointed out in the objects of the invention, the principal result being sought to prevent clogging or interruptions in the performance of the recovery steps of the methods by the formation of gas hydrates or freezing of liquids. Of course, hydrocarbon liquids themselves will not freeze, but where water or water vapors are admixed or are in contact therewith, gas hydrates will form where there is gas and water or water vapor and freezing, resulting in the formation of ice, may result where there is an admixture of liquids and water or water vapors. The formation of gas hydrates is most likely to occur where the flowing stream is largely gaseous and freezing is more likely to occur where liquids are accumulated as in the bottom of the tanks or in the reflux conductors. Gas hydrates are not necessarily ice, but appear in crystals similar to snow; however, such formations may develop into ice.

The invention is based primarily upon rendering the flow stream impotent to the formation of gas hydrates and thus avoiding or controlling such formation, or the dissolving or thawing out of hydrate or ice formations, by admixing with the stream a suitable reagent medium, preferably a liquid. Various steps may be combined and the method of condensing and precipitating the liquefiable hydrocarbon components is subject to many ramifications. Pressure reduction is of importance, but if recoveries could be made with little or no pressure reduction, such a procedure would be valuable under some conditions. Temperature reductions are more or less controlling and form a necessary part of the method. The results sought are the continuous operation of the plant and the recovery of liquefiable hydrocarbons at a minimum cost and in maximum quantities, as well as the conservation of high pressures.

It is well known that when treating flowing well streams for the recovery of liquefiable hydrocarbon components and separating gas within the pressure range of retrograde condensation, condensation and precipitation of such components results from pressure reduction alone, when confined to such range, but such condensation and precipitation is increased, and usually greatly increased, by reducing the temperature in addition to the condensation and precipitation which may result from pressure reduction alone. As before pointed out, condensation and precipitation of both water and hydrocarbon components occur during the flow from the reservoir to the well head, and cooling of the stream after it flows from the well head will cause further condensation and precipitation of both water and hydrocarbon components. It is, of course, desirable to remove the water and therefore it will be advantageous to take out as much water as is possible in the separator C; however, it may not be desirable to remove hydrocarbon liquids at this point, and, therefore, either with or without cooling, free water may be removed or extracted from the well stream, with or without the extracting of the hydrocarbon liquids. Very successful results have been had by cooling the well stream, then extracting the free liquids including both water and hydrocarbons and the carrying out of the method as hereinbefore described.

The term "liquids" as used herein is intended to cover either water or hydrocarbons or both. The well stream will be predominantly gaseous but it may include hydrocarbon liquids and such liquids may flow from the reservoir. Water may flow from the reservoir with the stream or it may result from the condensation of water vapors at some point in the flow prior to its extraction.

What I claim and desire to secure by Letters Patent, is:

1. The method of recovering hydrocarbon liquids from high pressure wells at pressures within the retrograde condensation range which includes, flowing a gaseous stream from the well in which stream condensed liquids are entrained, extracting free liquids from said stream, reducing the pressure of the flowing stream to approximately the ultimate pressure at which gas is separated therefrom, admixing a liquid reagent with the residual gaseous stream capable of rendering said stream impotent to the formation of gas hydrates at low temperatures, cooling said stream after reducing the pressure thereof to condense liquefiable hydrocarbons, separating the gas therefrom at high pressures within the range of retrograde condensation, and recycling the admixed liquids with the flowing stream.

2. The method of recovering hydrocarbon constituents from a high pressure well and separating gas therefrom at pressures within the retrograde condensation range which includes, flowing the well stream under such high pressure, cooling said stream to condense liquefiable fractions, separately extracting hydrocarbon and water condensates from said well stream to reduce its liquid content, admixing with the residual flowing stream a hydrocarbon liquefaction liquid for precipitating and agglomerating liquefiable hydrocarbon constituents contained in said stream, separating gas from the liquids of the stream at said high pressure, and introducing into said stream at some point in its flow a reagent immiscible with hydrocarbon liquids for rendering said stream impotent to the formation of gas hydrates when the temperature of said stream is reduced to a degree at which gas hydrates form.

3. The method of recovering hydrocarbon constituents as set forth in claim 2 wherein the reagent is admixed with the liquefaction liquid prior to the introduction of the latter into the flowing stream.

4. The method of recovering hydrocarbon constituents as set forth in claim 2 wherein the reagent is admixed with the flowing stream prior to the admixture of the liquefaction liquid with said stream.

5. The method of recovering hydrocarbon constituents from a high pressure well and separating gas therefrom at pressures within the retrograde condensation range which includes flowing a well stream under such high pressures, cooling said stream to condense liquefiable fractions, separately extracting hydrocarbon and water condensates from said well stream to reduce it to a predominantly gaseous stream, admixing with the residual gaseous stream a reagent immiscible with hydrocarbon liquids for rendering said stream impotent to the formation of gas hydrates when the temperature of said stream is reduced to a degree Fahrenheit at which gas hydrates form, separating the liquids from the gas while maintaining the pressure in said range, carrying off the separated hydrocarbon liquids and separating gas therefrom, and concurrently flowing a hydrocarbon absorption liquid with the stream prior to separating gas therefrom to absorb liquefiable hydrocarbon fractions therefrom.

JAY P. WALKER.